United States Patent
Yen et al.

(10) Patent No.: US 7,295,495 B2
(45) Date of Patent: Nov. 13, 2007

(54) XY PLATFORM DEVICE WITH NANOSCALE PRECISION

(75) Inventors: Ping-Lang Yen, Taoyuan (TW); Hsi-Hsun Tsai, Hsinchu (TW); Yu-Zen Chen, Taipei (TW); Gian-We Lin, Chung-Ho (TW); Tian-Sen Lu, Pa-De (TW); Wen-Yi Hsiao, I-Lan County (TW)

(73) Assignee: National Taipei University of Technology, Taipei (TW)

( * ) Notice: Subject to any disclaimer, the term of this patent is extended or adjusted under 35 U.S.C. 154(b) by 578 days.

(21) Appl. No.: 11/003,301

(22) Filed: Dec. 3, 2004

(65) Prior Publication Data

US 2005/0121597 A1 Jun. 9, 2005

(30) Foreign Application Priority Data

Dec. 4, 2003 (TW) ................................ 92221377 U

(51) Int. Cl.
*G11B 7/00* (2006.01)

(52) U.S. Cl. .................................. 369/44.11; 369/126
(58) Field of Classification Search ............. 369/44.11, 369/44.12, 126, 100
See application file for complete search history.

(56) References Cited

U.S. PATENT DOCUMENTS 6,658,922 B2 * 12/2003 Leigh et al. .................. 73/105

* cited by examiner

*Primary Examiner*—Nabil Hindi
(74) *Attorney, Agent, or Firm*—Apex Juris, pllc; Tracy M. Heims

(57) ABSTRACT

The present invention discloses an XY platform device with nanoscale precision including an optical pickup head for focusing and seeking the tracks of an optical data storage medium; a servo device for driving the optical pickup head to move in focusing and radial directions; a carrier platform for receiving a testing object thereon and providing a connecting member to be connected with the optical pickup head. With the focusing and radial movements of the optical pickup head, the carrier platform is driven to move accordingly, and thus achieving the high-precision and low-cost effects.

8 Claims, 2 Drawing Sheets

XY PLATFORM DEVICE WITH NANOSCALE PRECISION

FIELD OF THE INVENTION

The present invention relates to an XY platform device, more particularly to an XY platform device with nanoscale precision featuring a high precision and a low cost.

BACKGROUND OF THE INVENTION

As the technology for nanometer semiconductor fabrications matures, the 0.09 μm process obviously becomes a trend, the nano surface inspection technology will play a decisive role. Basic theories of near-field optics are utilized to obtain an evanescent wave, when the distance between a probe and the surface of a testing object is controlled below the wavelength of light. The near-field evanescent wave can keep the optics measurement resolution from extreme light diffractions to achieve the nano resolution scale. The design theory is to use a point light source having a size smaller than its wavelength to observe the surface of a matter. If the mode field diameter at the light source outlet of a point light source is a and the light intensity at the light source outlet position (z=0) is [3,4], then theoretically $$I(r,z=0)=\exp(-r^2/a^2) \quad (1)$$

Equation (1) is transformed by Fourier transforms to obtain a Gaussian distributed transversal wave vector ($k_r$). According to the Fourier optics, it is necessary to detect a transversal wave vector larger than 1/a as to obtain the optical resolution a. Since the vacuum wave vector (k=2π/λ) has the following relation with kr and the wave component vector ($k_z$) in the propagation direction:

$$k^2 = k_r^2 + k_z^2$$

And the high-resolution wave vector ($k_r$) is much larger than the wave vector of vacuum, $$k_z^2 \approx -k_r^2 \Rightarrow k_z \approx ik_r \approx i/a \quad (2)$$

Therefore, the super resolution cannot be propagated under a helpful mode, and its existing length is smaller than the range of a. If the distance between the point light source and the surface of the testing object is controlled within a range smaller than a, then the evanescent wave will have an effect on several nanometers of the surface of the testing object to provide a super optical resolution. If the surface of the testing object is scanned simultaneously, a high-resolution near-field optical image can be obtained. The lithography technology established by this foundation is known as the near-field optical lithography.

To produce the effect of a near-field optics, it is necessary to keep the distance between an optical fiber probe and the surface of a testing object smaller than the wavelength of the testing light as to break through the resolution for the limit λ/2 of the far-field optics and obtain a super measuring resolution. However, it is uneasy to measure an extremely small distance because the signal produced under such conditions is very weak. Firstly, a wave filter is needed, and then the weak signal is amplified by an amplify circuit for an optoelectronic conversion. Such amplified signal can provide a value approaching to the actual one. Furthermore, it requires a high-precision displacement system for the control, and a precise feedback signal definitely can provide the desired effect.

However, the prior-art displacement system is an XY platform, which only uses a motor or a roller wheel to control the displacement along the X-axis and the Y-axis. Although such arrangement can achieve the effect for the displacement of the XY platform, the precision is not high enough. Another traditional XY platform uses a magnetic levitation technology to control the displacement along the X-axis and Y-axis. Although this kind of XY platform has a high precision, its design is complicated and its cost is very high and not cost-effective.

In view of the shortcomings of the traditional XY platforms, the inventor of the present invention based on years of experience of related field to conduct research and development to overcome the shortcomings and finally invented an XY platform device with nanoscale precision that uses the movements of an optical pickup head in focusing and radial directions to drive the displacement of the XY platform device in order to achieve the high-precision and low-cost effects.

SUMMARY OF THE INVENTION

The primary objective of the present invention is to provide an XY platform device with nanoscale precision using the movements of an optical pickup head in focusing and radial directions to drive the displacement of the XY platform device in order to achieve the high-precision and low-cost effects.

To achieve the foregoing objective, the XY platform device with nanoscale precision in accordance with the present invention comprises an optical pickup head for seeking and focusing the tracks of an optical data storage medium; a servo device for driving the optical pickup head to move in focusing and radial directions; a carrier platform for receiving a testing object thereon and providing a connecting member to be connected with the optical pickup head. With the focusing and tracking movements of the optical pickup head, the carrier platform is driven to move accordingly, and thus achieving the high-precision and low-cost effects.

DETAILED DESCRIPTION OF THE PREFERRED EMBODIMENTS

To make it easier for our examiner to understand the objective of the invention, its innovative features and performance, a detailed description and technical characteristics of the present invention are described together with the drawings as follows.

Figure 1:
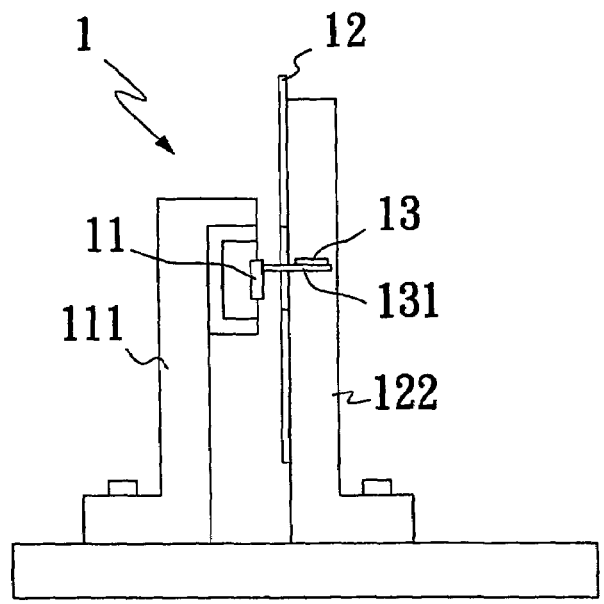
FIG. 1 is a side view of the present invention.
Figure 2:
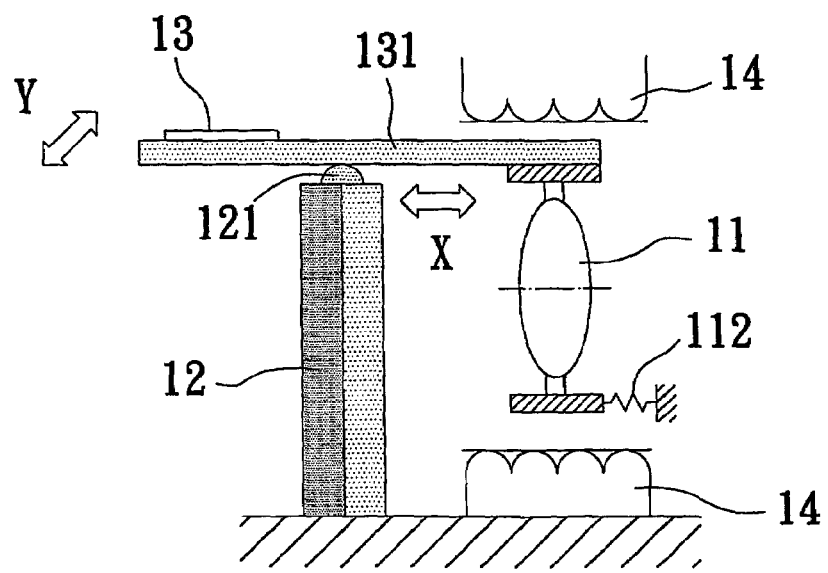
FIG. 2 is an enlarged view of the present invention.

Please refer to FIGS. 1 and 2 for the side view and enlarged view of the present invention respectively. In the figures, the XY platform device with nanoscale precision 1 of the invention comprises an optical pickup head 11, being disposed on an optical pickup head base 111 for focusing and seeking tracks of an optical data storage medium 12 placed on a base 122; a servo device 14 for driving the optical pickup head 11 to move to the focusing position; a carrier platform 13, for receiving a testing object and having a connecting member 131 to be coupled with the optical pickup head 11; wherein the optical pickup head 11 could be a DVD pickup head, a CD pickup head or a magneto-optic pickup head and have a spring 112 inside; the servo device 14 could be a voice coil motor; the carrier platform 13 could be a ceramic wafer; and a metal sphere can be installed at a position where the optical data storage medium 12 and the carrier platform 13 are in contact and perpendicular with each other to act as a fulcrum 121, such that the surface of the carrier platform 13 above the fulcrum 121 has a minimum deformation of material and thus is considered to be the best position to place a testing object.

Figure 3:
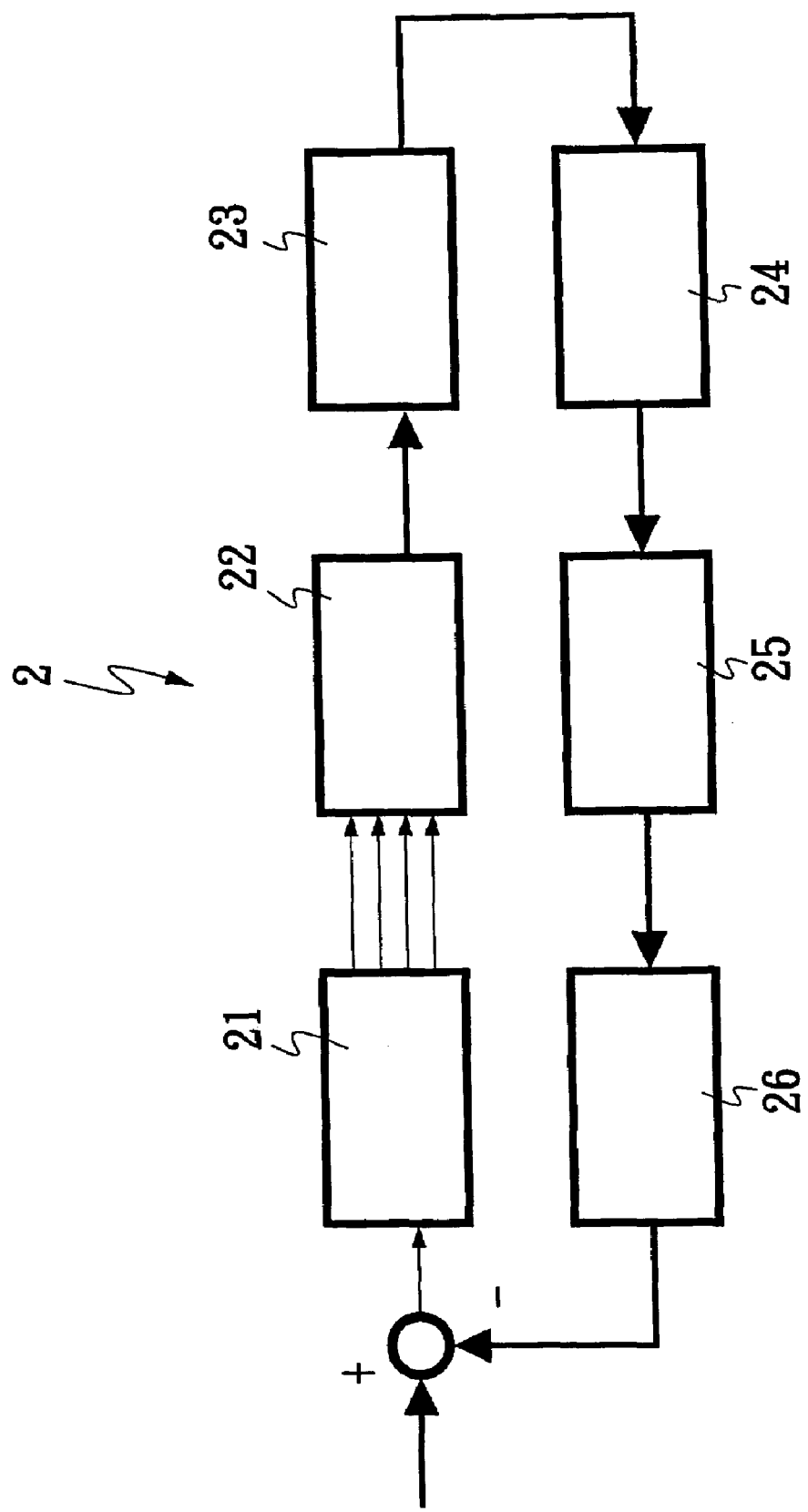
FIG. 3 is a flow chart of the servo control of a focusing system according to the present invention.

Please refer to FIG. 3 for the flow chart of the servo control of the focusing system. In the figure, an automatic focusing system 2 can divide a light beam produced by a laser diode and diffracted by a grating into 3 testing beams for an optical pickup head, and then the beams pass through a beam splitter and a collimator lens to merge the laser into a collimated beam. The beam will be reflected by the DVD or CD disk, follows the original path and passes through the collimated lens, the beam splitter, and the cylindrical divergent lens and then will be projected on a four-quadrant light detector 21. The four-quadrant light detector 21 outputs a defocus signal according to the light distribution of the light points on the four quadrants and sends the defocus signal to an operational amplifier 22 for an operational amplification and a compensation. The signal is sent to a controller 23 for controlling and turning on/off a voice coil power supply 24. As the power of the voice coil power supply 24 is turned on, an enable constant 25 will send the signal to a displacement unit 26 to drive the servo device 14 to push the optical pickup head 11 to a planar position for the position purpose. The linear area of the focus S curve for the optical pickup head 11 and the optical data storage medium 12 can be used as a reference for the displacement along the X-axis, and the divide signal during the track seeking can be used as a reference for the displacement along the Y-axis to drive the connecting member 131 to move the carrier platform altogether, and achieve a reliable and high-precision displacement and effectively lower the cost.

Therefore, the design of the XY platform device with nanoscale precision in accordance with the present invention enhances the performance over the conventional structure and further complies with the patent application requirements and is submitted to the Patent and Trademark Office for review and granting of the commensurate patent rights. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An XY platform device with nanoscale precision, comprising:
    an optical pickup head, for focusing and seeking the tracks of an optical data storage medium;
    a servo device, for driving said optical pickup head to move along a focused and tracked direction; and
    a carrier platform, for receiving a testing object and having a connecting member to be coupled with said optical pickup head.

2. The XY platform with nanoscale precision of claim 1, wherein said optical pickup head is a DVD pickup head.

3. The XY platform with nanoscale precision of claim 1, wherein said optical pickup head is a CD pickup head.

4. The XY platform with nanoscale precision of claim 1, wherein said optical pickup head is a magneto-optic pickup head.

5. The XY platform with nanoscale precision of claim 1, wherein said optical pickup head comprises a spring therein.

6. The XY platform with nanoscale precision of claim 1, wherein said servo device is a voice coil motor.

7. The XY platform with nanoscale precision of claim 1, wherein said carrier platform is a ceramic wafer.

8. The XY platform with nanoscale precision of claim 1, wherein said optical data storage medium and said carrier platform further comprise a metal sphere being disposed at the position where said optical data storage medium and said carrier platform are in contact with each other and acting as a fulcrum.

* * * * *